United States Patent
Bartoli et al.

(10) Patent No.: US 9,682,814 B2
(45) Date of Patent: *Jun. 20, 2017

(54) CAPSULE FOR BEVERAGE

(71) Applicant: Sarong Societa' per Azioni, Reggiolo (IT)

(72) Inventors: Andrea Bartoli, Reggio Emilia (IT); Alberto Bartoli, Quattro Castella (IT); Flavio Traldi, San Prospero (IT)

(73) Assignee: Sarong Societa' per Azioni (IT)

( * ) Notice: Subject to any disclaimer, the term of this patent is extended or adjusted under 35 U.S.C. 154(b) by 305 days.

This patent is subject to a terminal disclaimer.

(21) Appl. No.: 14/378,182

(22) PCT Filed: Feb. 21, 2013

(86) PCT No.: PCT/IB2013/051423
§ 371 (c)(1),
(2) Date: Aug. 12, 2014

(87) PCT Pub. No.: WO2013/124811
PCT Pub. Date: Aug. 29, 2013

(65) Prior Publication Data
US 2015/0108011 A1 Apr. 23, 2015

(30) Foreign Application Priority Data
Feb. 22, 2012 (IT) .............. MO2012A0043

(51) Int. Cl.
*A47J 31/06* (2006.01)
*B65D 85/804* (2006.01)
*A47J 31/40* (2006.01)

(52) U.S. Cl.
CPC ........ *B65D 85/8043* (2013.01); *A47J 31/407* (2013.01)

(58) Field of Classification Search
CPC ................................................ B65D 85/8043
(Continued)

(56) References Cited

U.S. PATENT DOCUMENTS 4,077,551 A * 3/1978 Manaresi ........... B65D 85/8043
206/221
5,242,702 A * 9/1993 Fond ................... A47J 31/0668
426/112

(Continued)

FOREIGN PATENT DOCUMENTS

EP 1500357 A1 1/2005

*Primary Examiner* — Arthur O Hall
*Assistant Examiner* — Adam J Rogers
(74) *Attorney, Agent, or Firm* — Laubscher, Spendlove & Laubscher, P.C.

(57) ABSTRACT

A capsule includes a casing provided with a base wall and a side wall defining a cavity that is suitable for containing an initial product to be combined with a fluid for making a final product. The base wall is provided with an outlet for dispensing the final product. The base wall is deformable and transitions from an initial configuration to a final configuration following a pressure increase inside the cavity. The capsule includes a closing element positioned inside the cavity, facing and adjacent to the base wall and provided with a closing portion arranged for engaging and closing the outlet in the initial configuration of the base wall, and for disengaging and opening the outlet in the final configuration so as to enable the final product to exit and be dispensed through the outlet of the base wall when it is in the final configuration.

17 Claims, 5 Drawing Sheets

(58) Field of Classification Search
USPC .......................................................... 99/295
See application file for complete search history.

(56) References Cited

U.S. PATENT DOCUMENTS

| | | | | |
|---|---|---|---|---|
| 2003/0056661 | A1* | 3/2003 | Hu | A47J 31/0668 |
| | | | | 99/495 |
| 2006/0174769 | A1* | 8/2006 | Favre | A47J 31/0668 |
| | | | | 99/275 |
| 2008/0028946 | A1* | 2/2008 | Kirschner | B65D 85/804 |
| | | | | 99/287 |
| 2010/0092629 | A1 | 4/2010 | Keller | |
| 2010/0326283 | A1 | 12/2010 | Evers et al. | |
| 2011/0064852 | A1 | 3/2011 | Mann | |
| 2015/0001100 | A1* | 1/2015 | Bartoli | B65D 85/8043 |
| | | | | 206/0.5 |
| 2015/0072052 | A1* | 3/2015 | Bartoli | A47J 31/3633 |
| | | | | 426/112 |
| 2015/0239654 | A1* | 8/2015 | Ayoub | A23F 3/18 |
| | | | | 426/115 |

* cited by examiner

US 9,682,814 B2

CAPSULE FOR BEVERAGE

CROSS REFERENCE TO RELATED APPLICATIONS

This application is a §371 National Stage Entry PCT International Application No. PCT/IB2013/051423 filed Feb. 21, 2013. PCT/IB2013/051423 claims priority to IT Application No. MO2012A000043, filed Feb. 22, 2012. The entire contents of these applications are incorporated herein by reference.

BACKGROUND OF THE INVENTION

The invention relates to capsules or containers for preparing beverages in automatic dispensing machines, in particular relating to a sealed single-dose and disposable capsule containing a percolatable or soluble or infusion product that is able to make a final product, for example a beverage by interacting with a pressurised fluid, typically water or milk.

Known capsules for use in known dispensing machines are disposable and single-dose containers including an external casing that is made of synthetic plastics and impermeable to liquids and gases and has a glass or cup shape. In particular, the casing has a bottom wall and a side wall defining a cavity provided with an upper opening through which the product can be inserted from which to obtain the beverage. The upper opening is hermetically closed by a cover, typically an aluminium sheet or a film of synthetic plastics in order to seal the product inside the cavity of the container. The capsule is perforable to enable the inflow of pressurized liquid, typically water, and the exit of the obtained beverage. In particular, the cover and the bottom wall of the casing are perforable by a suitable device of the dispensing machine, to enable the pressurized liquid to be delivered from above and the beverage to be extracted from below, respectively.

One drawback of the known capsules disclosed above lies in the fact that they can only be used in dispensing machines provided with a dispensing circuit including an extracting device suitable for piercing the bottom of the capsules to enable the beverage to exit and a conduit suitable for conveying the beverage to the consumption container (for example a mug, a cup, a glass, etc). This dispensing circuit makes the structure of the machine more complex and costly. Further, since it is in contact with the dispensed beverages, it should be properly washed after each dispensing, both for hygienic reasons and in order not to compromise the taste and quality (organoleptic properties) of a subsequently dispensed beverage (for example an aromatic herbal tea dispensed after a coffee). Nevertheless, a washing device of the dispensing circuit is not always present in known machines because of difficulty in construction and added costs.

Known dispensing machines further include a supply circuit provided with injection devices (such as needles or sharpened nozzles) that pierce the cover and deliver the pressurized liquid originating from a pump and/or a boiler.

Capsules are also known that are provided with a filtering element that is inserted inside the external casing to enable the fluid or beverage to pass and prevents the exit of the product if it is not soluble.

With the capsules provided with filtering elements on the bottom wall, the extracting device is not required in the dispensing machine since the beverage leaving the capsule can be poured directly into a consumption container.

The aforesaid capsules nevertheless have the drawback of not hermetically closing the product, owing to the filtering element on the bottom, and therefore for hygienic and product conservation reasons they have to be suitably packaged, for example in sealed bags, preferably in a controlled atmosphere, with a consequent further increase in production costs.

Known capsules provided with a filtering element enable beverages to be obtained by percolation of the liquid through the product (typically coffee) or by infusion of the product (tea, herbal tea etc).

SUMMARY OF THE INVENTION

One object of the present invention is to improve known disposable and single-dose capsules for beverages, containing an initial product, in particular a percolatable product or infusion or soluble or frozen or dehydrated product suitable for interacting with a fluid, typically hot pressurised water, to prepare in an automatic dispensing machine a final product, for example a beverage or other food product.

Another object is to make capsule that is able to dispense a final product directly into a consumption container (cup, glass, etc) without the need to be pierced by means of the dispensing machine.

A further object is to obtain a hermetically closed capsule that is able to preserve and isolate from the environment in an optimum manner the initial product contained therein, without requiring a special packaging.

Still another object is to make a capsule that enables the final product prepared in the container to be dispensed in a controlled and uniform manner, in particular at a reduced and contained exit pressure and speed.

Another object is to obtain a capsule that enables parts of the dispensing machine not to be sullied or polluted with the final product, thus ensuring both the hygiene and the cleanliness of the dispensing machine and the taste and quality, i.e. the integrity of the organoleptic properties of the final product.

These objects and still others are achieved by a capsule according to any one of the claims set out below.

BRIEF DESCRIPTION OF THE FIGURES

The invention can be better understood and implemented with reference to the attached drawings that illustrate some embodiments thereof by way of non-limiting example, in which:

FIG. 6 is a plan view of a version of the capsule of the invention;

DETAILED DESCRIPTION

Figure 1:
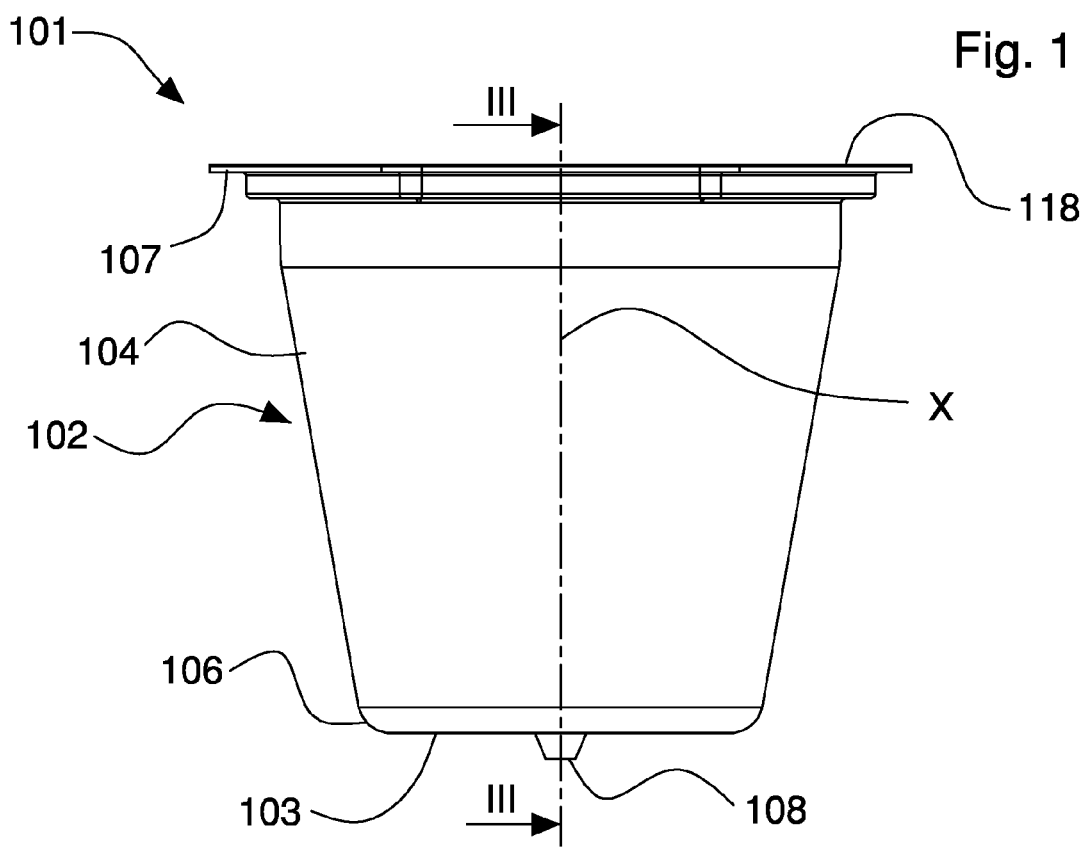
FIG. 1 is a frontal view of the capsule according to the invention.
Figure 2:
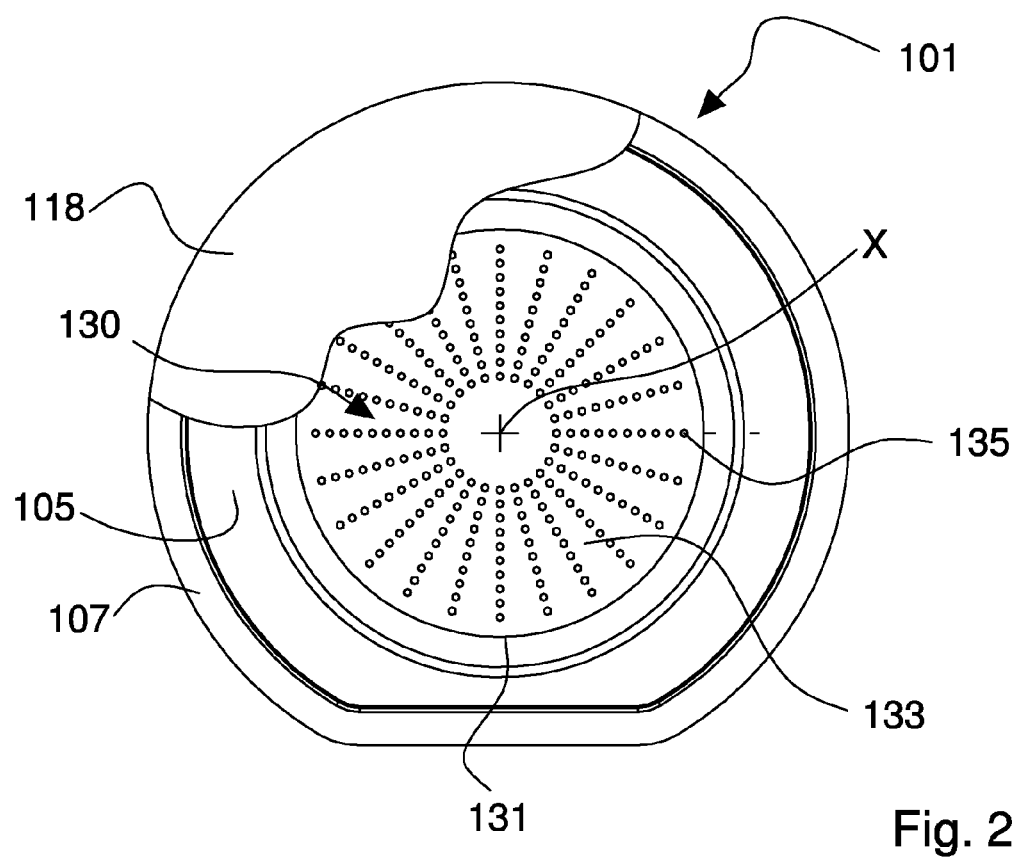
FIG. 2 is a top plan view of the capsule in FIG. 1.
Figure 3:
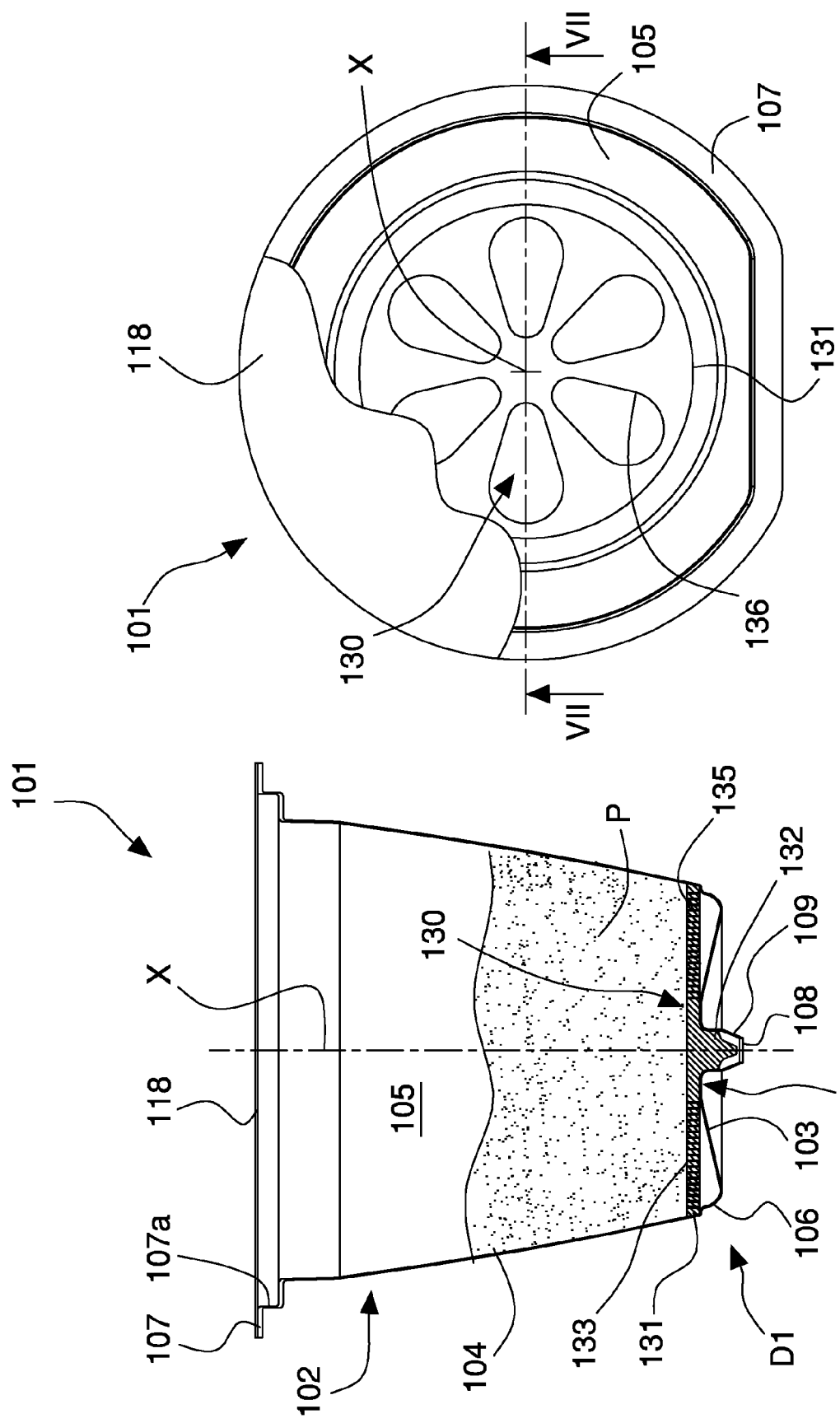
FIG. 3 is a section according to line III-III in FIG. 1.

With reference to FIGS. 1 to 5, a capsule 101 according to the invention is illustrated, containing an initial product P and usable in a dispensing machine for producing by injection of a pressurised fluid therein, a final product B, for example a beverage such as coffee, barley, tea, etc.

The capsule 101 of the invention comprises an external casing 102, or container, substantially in the shape of a glass or cup, provided with a base wall 103 and with a side wall 104 defining an open cavity 105 and suitable for containing the initial product P from which to obtain the final product B.

The casing 102 is made by forming a sheet of thermoformable material, in particular a multilayered plastic material that is impermeable to liquids and to gases and is suitable for contact with foodstuffs.

Figure 4:
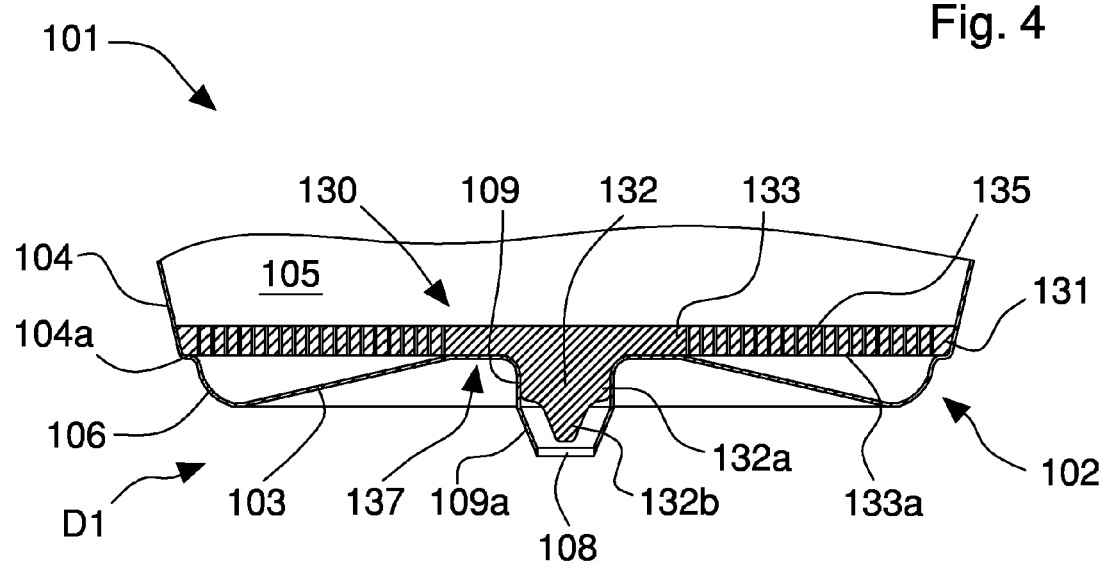
FIG. 4 is an enlarged view of the section in FIG. 3 illustrating a closing element associated with a base wall of a casing of the capsule, said base wall being arranged in an initial configuration.
Figure 5:
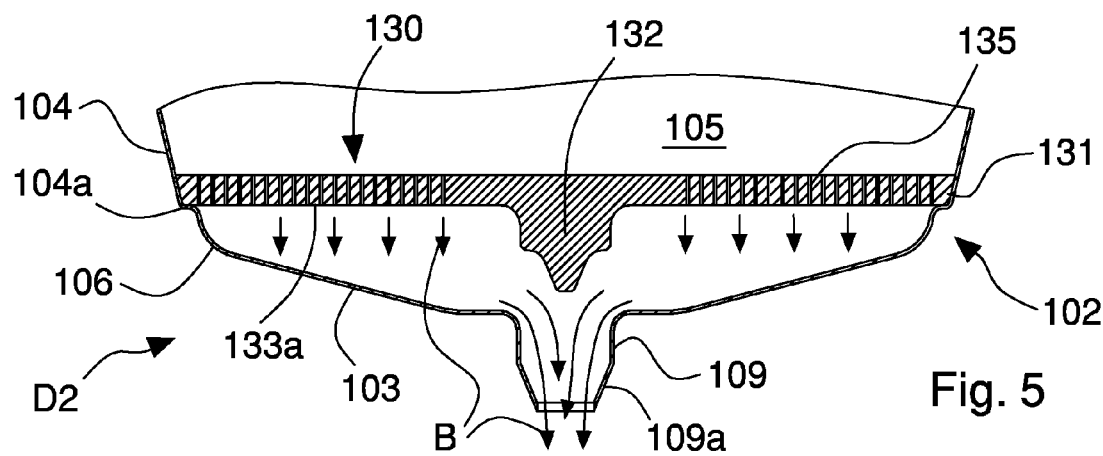
FIG. 5 is a section like the one in FIG. 4 in which the base wall is in a final configuration for dispensing a final product.

The base wall 103, as better disclosed further on in the description, is deformable and can be arranged, or configured or be deformed or folded, from an initial configuration D1 to a final configuration D2 following a pressure increase inside the cavity 105 due, for example, to the delivery of pressurised fluid F. More precisely, as illustrated in FIGS. 4 and 5, the base wall 103 owing to the internal pressure in the cavity 105, from the initial configuration D1, in which it is folded or curved towards the inside of the cavity 105, in particular in such a manner as to form a substantially convex wall, adopts or is arranged in the final configuration D2, in which it is folded or curved towards the exterior of the cavity 105, in particular in such a way as to form a substantially concave wall.

The side wall 104 diverges from the base wall 103 as far as a peripheral edge 107, for example with an almost frustoconical shape.

The base wall 103 is provided with an outlet 108, for example an opening or a hole, for dispensing the final product B directly into a consumption container.

The casing 102 further comprises a connecting wall 106 that is interposed between the base wall 103 and the side wall 104.

The capsule 101 is provided with a closing element 130 arranged inside the cavity 105, facing and adjacent to an internal surface of the base wall 103.

The closing element 130 comprises a closing portion 132 arranged for selectively engaging and closing the outlet 108 when the base wall 103 is in the initial configuration D1 or for disengaging and opening the outlet 108 when, following the pressure increase in the cavity 105, the base wall 103 adopts the final configuration D2, so as to enable the final product B to be dispensed.

The outlet 108 is in particular made in a dispensing conduit 109 of the base wall 103. The dispensing conduit 109 is provided with an end portion 109a which is substantially convergent, in particular frustoconical shaped. The dispensing conduit 109 and the outlet 108 are arranged centrally on the base wall 103, substantially aligned on a longitudinal axis X of the capsule 1.

The closing element 130 is a substantially flat disc element, made of plastics, for example by injection moulding.

The closing element 130 comprises a peripheral side portion 131 suitable for abutting, in particular with interference, on the side wall 104 and/or the connecting wall 106 of the casing 102 and a central portion 133 interposed between the side portion 131 and the closing portion 132.

In the embodiment shown in FIGS. 1 to 5, the closing element 130 also acts as a filtering element and comprises for this purpose a plurality of passages or conduits 135 made in the central portion 133 in order to ensure the passage and thus the exit from the capsule 101 of the final product B and at the same time prevent the exit of the initial product P. In this manner, the closing element 130 defines inside the cavity 105 a chamber suitable for containing the initial product P.

The side portion 131 of the closing element 130 is fixed, in particular welded or glued, to the side wall 104 and/or to the connecting wall 106.

In the illustrated embodiment, the closing element 130 has an almost circular disc shape and the side wall 104 has a peripheral protrusion 104a that is suitable for abutting on and supporting the closing element 130 along the entire side portion 131 thereof.

The closing portion 132 comprises, from the central portion 133, a first tapered portion 132a, having in particular a first taper, intended for closing the outlet 108, and a second tapered portion 132b, in particular having a second taper, arranged for conveying outwards the final product B in cooperation with the outlet 108. More precisely the first portion 132a abuts internally on and closes the dispensing conduit 109 and thus the outlet 108, in the initial configuration D1 of the base wall 103.

A joint portion 137 is provided for fixing the closing element 130 to the base wall 103 at the closing portion 132, such as to hermetically close the outlet 108 in the initial configuration D1 of the base wall 103. The joint portion 137 is made by fixing, for example by heat welding or ultrasonic welding, an annular portion of the base wall 103, arranged around the outlet 108 and the dispensing conduit 109, to a corresponding annular portion of an external face 133a of the central portion 133 arranged around the closing portion 132.

The joint portion 137 is such as to enable the base wall 103 to be detached easily from the closing element 130— and the closing portion 132 to be thus disengaged from the outlet 108—when the aforesaid base wall 103, owing to the increase of pressure inside the cavity 105, is arranged or is deformed from the initial configuration D1 to the final configuration D2. The joint portion 137 is, however, such as to close the cavity 105 hermetically from the external environment in such a manner as to preserve and insulate the initial product P for the hygiene and conservation of the latter.

The capsule 102 further includes a cover element 118 fixed to the edge 107 of the casing 102 to close the cavity 105 hermetically. The cover element 118 is perforable, in particular by an injection device of the fluid F of a dispensing machine. The cover element 118 includes, for example, a sheet of aluminium or plastics.

In the operation or use of the capsule 101 of the invention provides, the fluid F is initially delivered inside the cavity 105 through an injection device of the dispensing machine into which the capsule is inserted. The injection device is able to pierce the cover element 118 and inject the fluid F that interacts with the initial product P to form the final product B, typically a beverage. In the initial dispensing step, the base wall 103 is arranged or configured in the initial configuration D1 and the closing portion 132 of the closing element 130 is engaged and closes the outlet 108, preventing the exit of the initial product P and/or of the final product B.

As the pressure inside the cavity 105 increases, following the inflow of the pressurised fluid F, the base wall 103 it is deformed and curved outwards, i.e. it turn outwards, in the final configuration D2 in which it adopts a concave shape in such a manner as to enable the outlet 108 to open. The joint portion 137 is separated in this step.

As illustrated in detail in FIG. 5, in this final configuration D2 of the base wall 103, the closing portion 132 of the closing element 130 does not engage with the outlet 108 enabling the outer flow of the final product B.

It should be observed that in this step the second portion 132b of the closing portion 132 of conical shape directs and conveys the flow of product to the convergent and conical end portion 109a of the dispensing conduit 109. In this manner an outflow from the capsule is guaranteed that is uniform, free of squirts, splashes and jets.

The gradual and progressive exit of the final product B from the capsule 101 (thus without squirts, splashes and jets) is also ensured by the gradual opening of the outlet 108, as the base wall 103 does not move from the initial configuration to the final configuration D2 quickly or suddenly, but gradually as the pressure inside the cavity 105 increases.

One advantage of the capsule 101 of the present invention is to dispense a final product, for example a beverage or another fluid food product, directly into a consumption container (cup, glass, etc) without the need to be pierced below. The controlled deformation of the base wall 103, from the initial configuration D1 to the final configuration D2, and the presence of the closing element 130 in fact enable the outlet 108 to open automatically and gradually as the pressure increases inside the capsule 101.

The closing element 130 provided with passages 135 further prevents the exit of the initial product P if there is no percolatable or infusion product.

The capsule 101 of the invention can thus be used on a dispensing machine devoid of a dispensing circuit because this capsule does not require an extracting device that is suitable for piercing the bottom thereof to enable the beverage to exit therefrom nor a conduit for conveying the beverage to the consumption container (for example a mug, a cup, a glass etc).

The absence of the dispensing circuit makes the dispensing machine simpler and cheaper and further ensures the hygiene of the dispensing process and maintenance of the quality of the dispensed beverages as contamination between successive dispensed beverages is impossible.

A further advantage of the capsule 101 is that it does not require a special sealed package as the joint portion 137 that fixes the base wall 103 to the closing element 130 enables the cavity 105 to be closed hermetically from the external environment so as to preserve and insulate the initial product P for the hygiene and conservation of the latter. The capsule 101 of the invention thus enables production costs to be reduced with respect to the known capsules provided with filtering elements.

Figure 7:
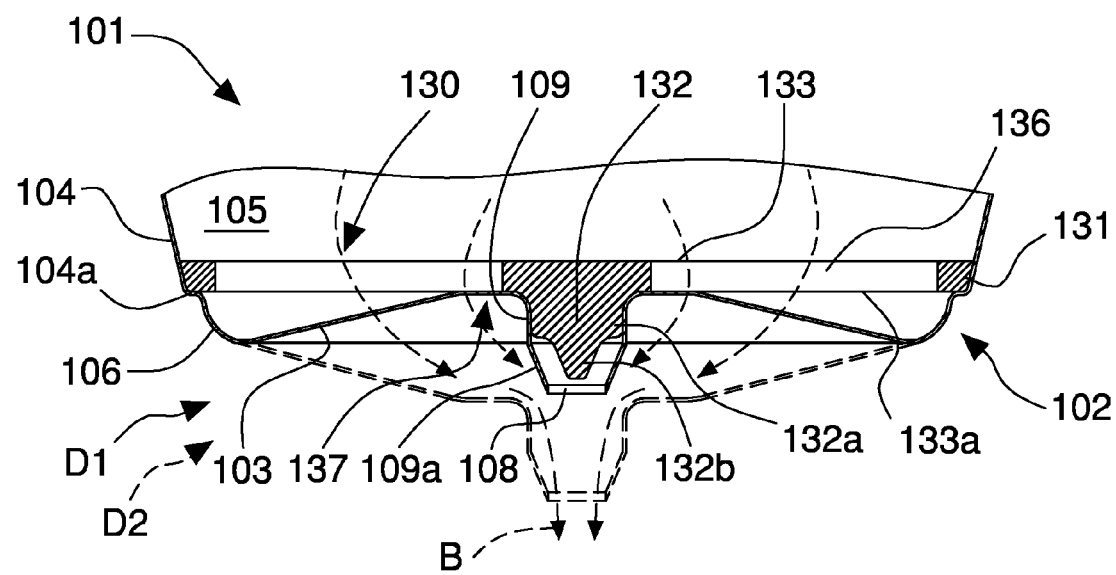
FIG. 7 is an enlarged partial section according to line VII-VII of FIG. 6 that illustrates the closing element and the base wall, the latter arranged in the initial configuration and, in a dashed line, in the final configuration.

FIGS. 6 and 7 illustrate a version of the capsule 101 of the invention that differs from the previously disclosed embodiment by the closing element 130, which in this case is devoid of filtering passages or conduits that are able to retain or prevent the exit of the initial product P and at the same time enable the final product B to exit. The closing element 130 in fact comprises one or more through openings 136 made in the central portion 133 of the closing element 130 to enable the product to pass through.

The operation of this version of the capsule 101 is substantially identical to that of the capsule illustrated in FIGS. 1 to 5.

Figure 8:
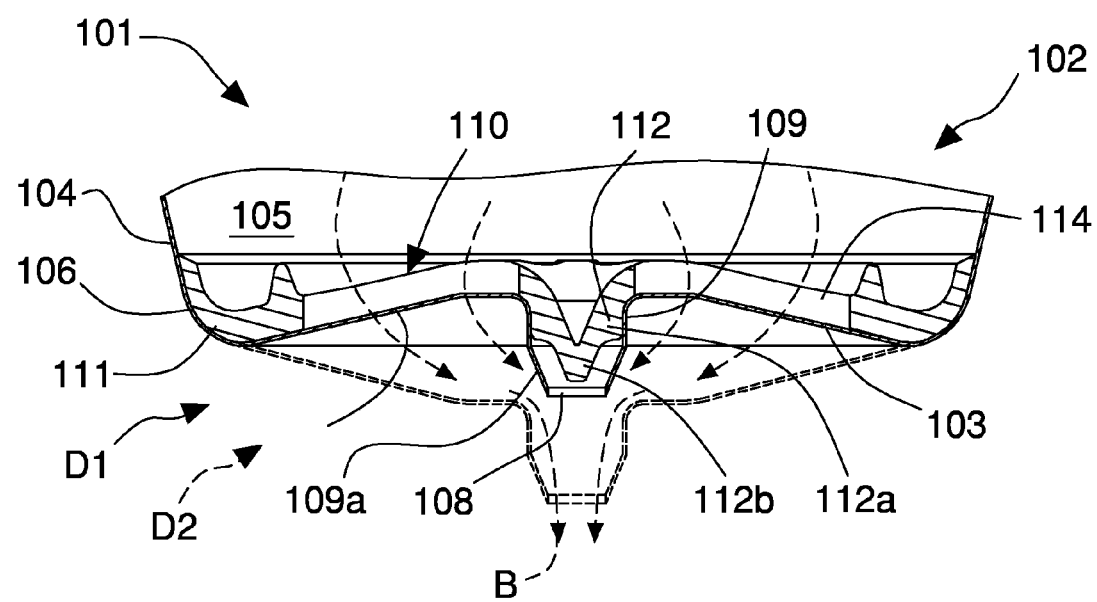
FIG. 8 is a partial enlarged section of another version of the capsule of the invention that illustrates the closing element and the base wall, the base wall arranged in the initial configuration and, on a dashed line, in the final configuration.

FIG. 8 illustrates a further version of the capsule 101 of the invention that differs from the embodiments disclosed above by the different closing element 110. The latter is associated with an internal surface of the base wall 103 and arranged selectively for closing the outlet 108 when the base wall 103 is in the initial configuration D1 or for opening the outlet 8 when, following the pressure increase inside the capsule, the base wall 103 adopts the final configuration D2, so as to enable the final product B to be dispensed.

The closing element 110 is a substantially flat disc element made of elastomeric material. The closing element 110 comprises a peripheral side portion 111 suitable for abutting, in particular with interference, on the side wall 104 and/or the connecting wall 106 of the casing 2, a closing portion 112 suitable for engaging and closing the outlet 108, i.e. sealingly inserting into the dispensing conduit 109, and a central portion 113 shaped in such a manner as to abut on the base wall 103, when the latter is in the initial configuration D1. The central portion 113 is interposed between the closing portion 112 to the side portion 111.

In the illustrated embodiment, the closing element 110 has an almost circular plan shape and the central portion 113 comprises at least one through opening 114 for the passage of the final product B. More precisely, the central portion 113 is provided with a plurality of through openings or holes 114, for example six and lobe-shaped, arranged angularly spaced from one another, for example by the same angle. The through openings 114, in addition to enabling the final product B to flow during a dispensing step, as explained better further on in the description, enable the central portion 113 to abut on and adhere better to the base wall 103, when the base wall 103 is in the initial configuration D1.

The closing portion 112 of the closing element 110 comprises, starting from the central portion 113, a tapered first portion 112a, having in particular a first taper, intended for closing the outlet 108 and a second tapered portion 112b, in particular having a second taper, arranged for conveying outwards the final product B in cooperation with the outlet 108. More precisely, the first portion 112a abuts internally on and closes the dispensing conduit 109 and thus the outlet 8.

The operation of this version of the capsule 101 of the invention is substantially similar to that of the capsule illustrated in FIG. 7.

Figure 9:
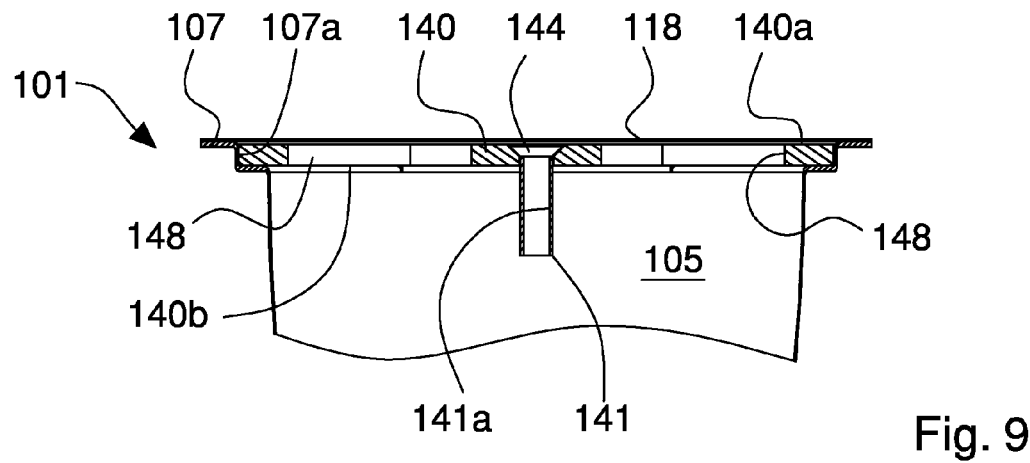
FIG. 9 is a partial section of a further version of the capsule of the invention.

FIG. 9 illustrates another further version of the capsule 101 of the invention that differs from the embodiment disclosed above and illustrated in FIGS. 1 to 5 by the fact that it comprises a supporting element 140 fixed to the edge 107 of the casing 102 and facing the cavity 105 and to which at least one nozzle 141 is fixed that is arranged for delivering the fluid F into the cavity 105.

In particular, the edge 107 forms an annular seat 107a that receives a peripheral edge of the supporting element 140 that can be fixed there by welding or gluing or by interference fitting.

The supporting element 140 comprises a body having a substantially flat shape, for example a disc, and is provided with one or more respective openings 148, for example two, to enable the initial product P to be introduced into the cavity 105 of the capsule 1, in a capsule 1 filling step.

The nozzle 141 is fixed to an internal face 140b of the supporting element 140, whereas on an opposite external face 140a of the supporting element 140 a supply hole 144 is provided that is flowingly connected to an internal conduit 141a of said nozzle 41.

At least one venting or ventilation hole is provided on the supporting element 140 to permit the necessary exit of air or gas contained in the capsule 101 to escape during the step of filling the capsule 101 with the fluid F.

The supporting element 140 and the nozzle 141 can be made in a single body, for example by a process of injection moulding of plastics.

The supply hole 144 of the supporting element 140 is arranged for engaging with an injection device of the dispensing machine including in this case a needle or similar element arranged for piercing the cover element 118 and being inserted and sealingly abutting on the supply hole 144 so as to deliver the fluid F into the cavity 105. The injection device can include a further needle or similar element arranged for piercing the cover element 118 and inserting itself and sealingly abutting on the venting hole of the supporting element 140, in such a manner as to enable the air to exit the capsule 1.

It should be noted that with this version of the capsule 101 of the invention, the injection device of the dispensing machine does not come into contact with the initial product P, thus guaranteeing the hygiene of the dispensing process and the quality of the beverages at each dispensing, preserving the organoleptic properties thereof.

The operation or use of this version of the capsule 101 of the invention is substantially identical to that of embodiments disclosed above.

Figure 10:
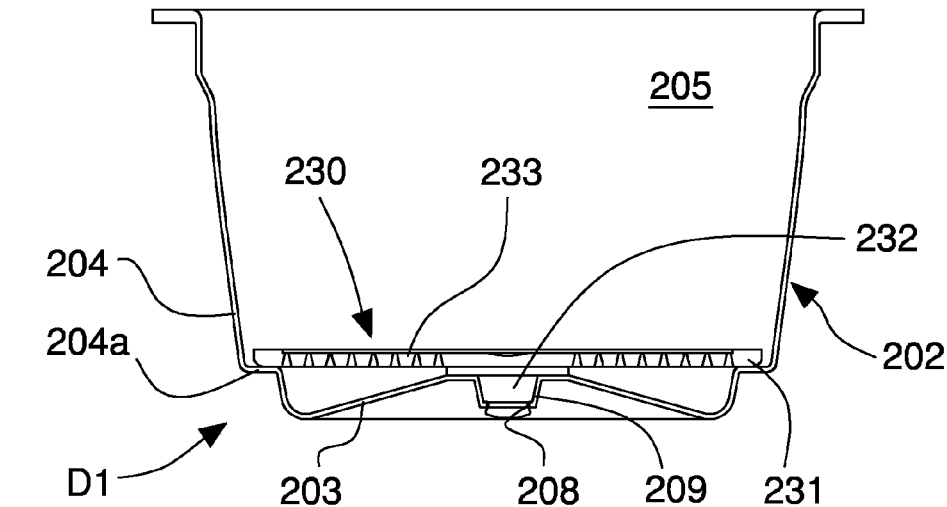
FIG. 10 is a section of a still further version of the capsule of the invention.
Figure 11:
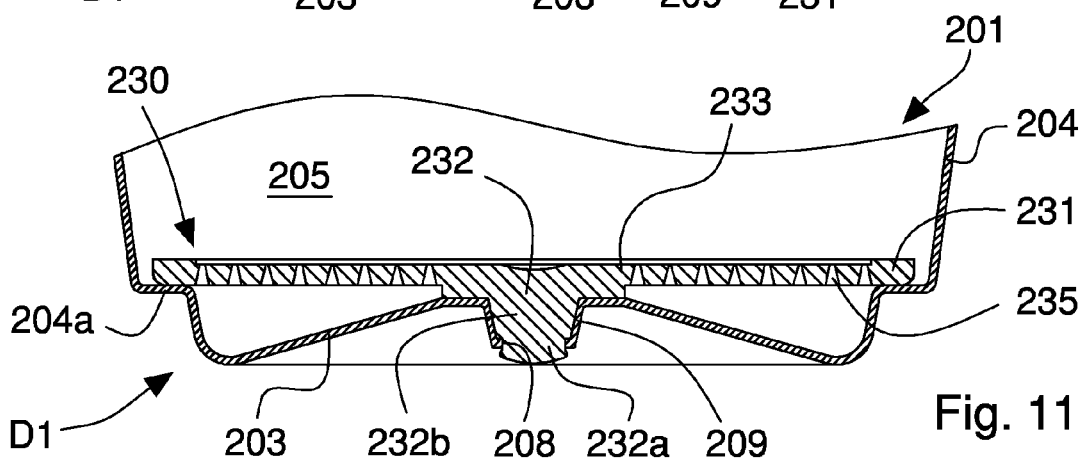
FIG. 11 is an enlarged view of the section in FIG. 10 that illustrates the closing element associated with the base wall arranged in the initial configuration.
Figure 12:
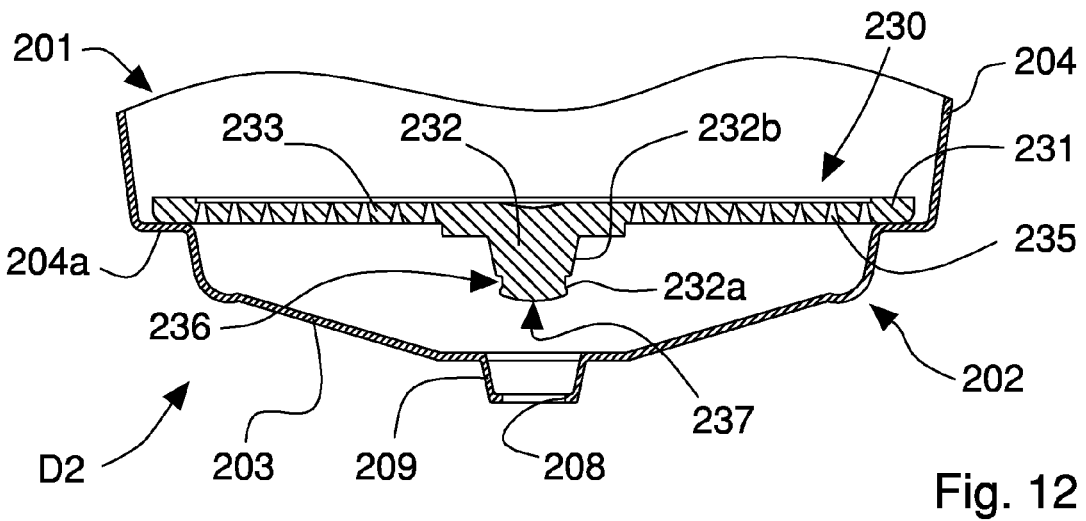
FIG. 12 is a section like the one in FIG. 11 in which the base wall is in the final configuration.

FIGS. 10 and 12 illustrate another version of the capsule 201 of the invention that differs from the embodiment disclosed above and illustrated in FIGS. 1 to 5 by the closing element 230 that comprises a closing portion 232 arranged for engaging with interference in the outlet 208 of the base wall 203 of the casing 202 of the capsule 201 in the initial configuration D1 of said base wall 203. The outlet 208 is made in the dispensing conduit 209 of the base wall 203.

The closing element 230 further comprises a peripheral side portion 231 that abuts on and is supported by an internal peripheral protrusion 204a of the side wall 204 of the casing 201. A central portion 233, interposed between the side portion 231 and the closing portion 232, comprises a plurality of passages 235 that enable the final product to exit the capsule 201 and prevent the initial product from exiting the capsule 201.

The closing portion 232 comprises a further first portion 232a and a further second portion 232b, the latter interposed between said first portion 232a and said central portion 233. In the initial configuration D1, the further first portion 232a is arranged for engaging with interference and thus hermetically closing the outlet 208, whereas the further second portion 232b is arranged for engaging and abutting on a respective internal wall of the dispensing conduit 209. In particular, the further first portion 232a comprises, from the further second portion 232b, an annular groove 236 and a divergent portion 237 that extends outwards and protrudes from the outlet 208 (FIG. 12).

In the initial configuration D1 of the base wall 203, the edges of the outlet 208 engage with interference in the annular groove 236 and the divergent portion 237 protrudes from the casing 202 and from the outlet 208. The dimensions of the divergent portion 237 are greater than those of the outlet 208. In this manner, the divergent portion 237 forms of sort of undercut that immobilises as a wedge the closing portion 232 on the outlet 208.

Further, as the section of the annular groove 236 is greater than the section of the outlet 208, in the initial configuration D1 the further first portion 232a is inserted and immobilised with interference in the outlet 208 and achieves in this manner the hydraulic seal, i.e. hermetically seals the cavity 205 of the casing 202 from the external environment in such a manner as to preserve and insulate the initial product contained therein.

In this case a joint portion to fix the closing element 230 to the base wall 203 to close the outlet 208 hermetically in the initial configuration D1 is thus not necessary.

Owing to the elasticity and/or deformability of the materials used for the casing 202 and for the closing element 230, as the pressure increases inside the cavity 205 the base wall 203 is deformed and curves outwards in the final configuration D2 and the further first portion 232a of the closing portion 232 disengages from the outlet 208 so as to enable the final product to exit. The pressure of the fluid inside the cavity 205 and acting on the base wall 203 is such as to overcome the resistance offered by the coupling with interference between the further first portion 232a and the outlet 208.

The invention claimed is:

1. A capsule, comprising a casing including a base wall and a side wall defining a cavity that is suitable for containing an initial product to be combined with a fluid for making a final product, said base wall containing an outlet for dispensing the final product, wherein said base wall is deformable from an initial closed configuration to a final open configuration in response to an increase in pressure inside said cavity, and further wherein said capsule includes a closing element positioned inside said cavity, facing and adjacent to said base wall and including a closing portion arranged for engaging and closing said outlet in said initial closed configuration of said base wall, and for disengaging and opening said outlet in said final open configuration of said base wall to enable said final product to be dispensed through said outlet.

2. A capsule according to claim 1, wherein said base wall is deformable from said initial closed configuration to said final open configuration towards the outside of said cavity, in particular in such a way as to form a substantially concave wall.

3. A capsule according to claim 1, wherein said outlet is arranged in a dispensing conduit of said base wall.

4. A capsule according to claim 3, wherein said dispensing conduit includes a frustoconical shaped terminal portion.

5. A capsule according to claim 1, wherein said closing portion comprises a first portion for closing said outlet and a second portion for conveying said final product outwardly in cooperation with said outlet.

6. A capsule according to claim 3, wherein said closing portion comprises a further first portion arranged for engaging with interference and hermetically closing said outlet in said initial configuration of said base wall.

7. A capsule according to claim 6, wherein said further first portion comprises an annular groove and a divergent portion, said annular groove being arranged for engaging with interference with edges of said outlet in said initial closed configuration of said base wall and said divergent portion protruding outwards from said outlet.

8. A capsule according to claim 6, wherein said closing portion comprises a further second portion arranged for engaging a respective internal wall of said dispensing conduit in said initial closed configuration of said basewall.

9. A capsule according to claim 1, and further comprising a joint portion suitable for fixing said closing portion to said base wall to hermetically close said outlet in said initial closed configuration of said base wall.

10. A capsule according to claim 1, wherein said closing element is a filtering element containing with a plurality of passages for enabling said final product to exit from said capsule and for preventing said initial product from exiting from said capsule.

11. A capsule according to claim 1, wherein said closing element comprises a side portion suitable for abutting on said side wall and/or a connecting wall of said casing which is interposed between said base wall and said side wall.

12. A capsule according to claim 11, wherein said side portion of said closing element is fixed to said side wall and/or to said connecting wall.

13. A capsule according to claim 11, wherein said closing element is a filtering element containing a plurality of passages for enabling said final product to exit from said capsule and for preventing said initial product from exiting from said capsule, and wherein said closing element comprises a central portion that is interposed between said side portion and said closing portion, said plurality of passages being arranged in said central portion.

14. A capsule according to claim 11, wherein said closing element comprises a central portion, interposed between said side portion and said closing portion and configured to abut said base wall in said initial closed configuration.

15. A capsule according to claim 14, wherein said central portion comprises at least one through opening for the passage of said final product.

16. A capsule according to claim 1, and further comprising a cover element fixed to an edge of said casing for hermetically closing said cavity, said cover element being pierceable, by an injecting device of the fluid of a dispensing machine.

17. A capsule according to claim 1, and further comprising a supporting element connected with an edge of said casing and facing said cavity and at least one nozzle connected with said supporting element for delivering said fluid into said cavity.

* * * * *